Nov. 7, 1939.   D. F. HERMAN ET AL   2,179,039
FREEZING MACHINE
Filed Feb. 14, 1939    2 Sheets-Sheet 1
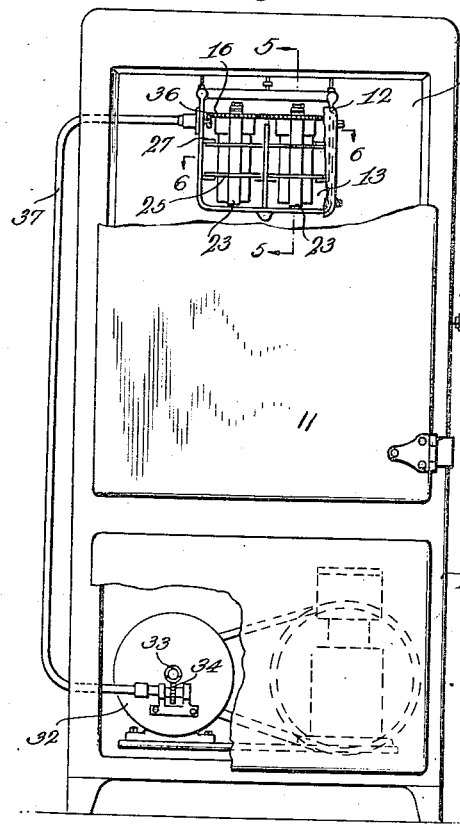
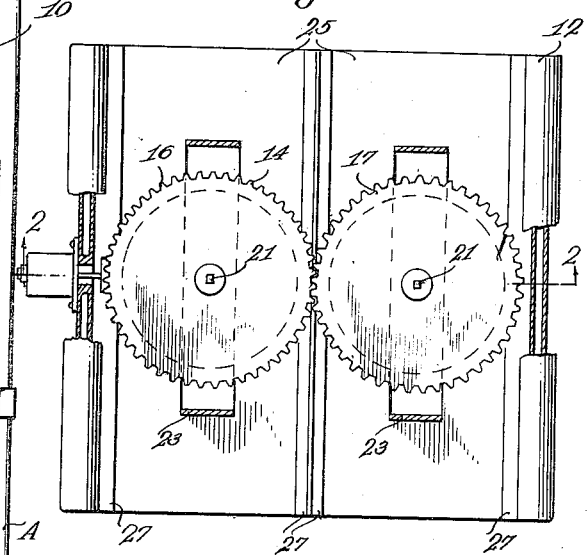
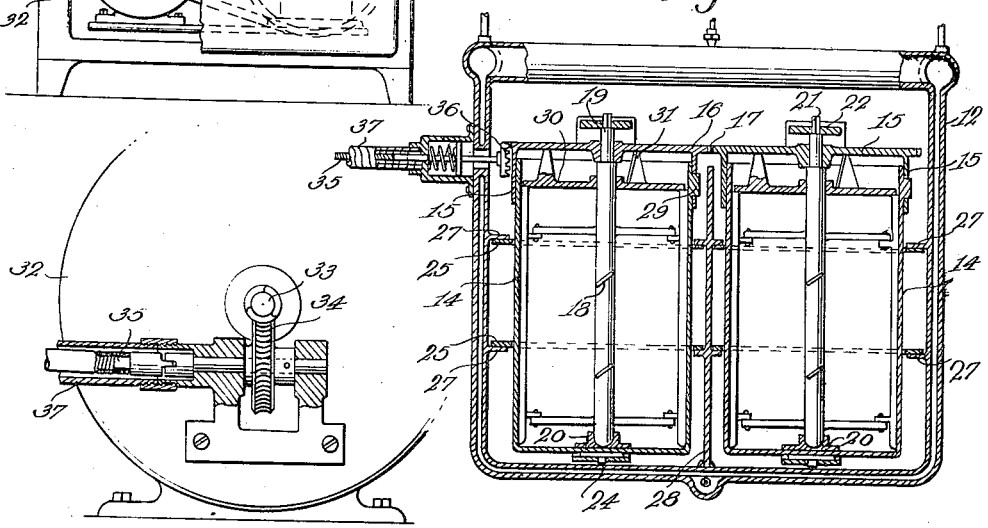
Dock F. Herman &
Josef Nordenhaug
INVENTORS
BY Victor J. Evans & Co.
ATTORNEYS Nov. 7, 1939.　　D. F. HERMAN ET AL　　2,179,039
FREEZING MACHINE
Filed Feb. 14, 1939　　2 Sheets-Sheet 2

Dock F. Herman
Josef Nordenhaug
INVENTORS

BY Victor J. Evans & Co.
ATTORNEYS

Patented Nov. 7, 1939

2,179,039

UNITED STATES PATENT OFFICE 2,179,039

FREEZING MACHINE

Dock F. Herman and Josef Nordenhaug,
Vinton, Va.

Application February 14, 1939, Serial No. 256,389

2 Claims. (Cl. 259—49)

The invention relates to a freezing machine and more especially to an iceless freezing apparatus for iceless refrigerators.

The primary object of the invention is the provision of an apparatus of this character, wherein the same is adaptable for fitting within a freezing unit within an iceless refrigerator so that ice cream or other frozen confections may be had, the freezing apparatus being driven from the motor of the refrigerator or iceless machine and without the necessity of the use of ice for freezing purposes.

Another object of the invention is the provision of an apparatus of this character, wherein on the expansion in the process of the freezing of cream or confections therein the power for the operation of the apparatus will be automatically shut off or disconnected from such apparatus so that the same will become passive yet the frozen product will be maintained in a frozen condition during storage within the iceless machine or refrigerator.

A further object of the invention is the provision of an apparatus of this character, wherein frozen products may be prepared in a unique and convenient manner and such products in the freezing thereof being subjected to stirring action resulting in the perfect freezing, in the composition and the flavoring of the frozen product.

A still further object of the invention is the provision of an apparatus of this character, wherein the construction thereof is novel in its entirety and is adaptable for fitting within a freezing unit within an iceless machine or refrigerator and is automatically operated for freezing purposes in the freezing of cream or confections.

A still further object of the invention is the provision of an apparatus of this character, which is extremely simple in its construction, thoroughly reliable and efficient in operation, constituting a built-in part of an iceless machine or refrigerator, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is an elevation partly in section of an iceless machine showing the apparatus constructed in accordance with the invention built therewith.

Figure 2 is an enlarged vertical sectional view through the freezing unit and the apparatus associated therewith, a portion of this view being in elevation, being preferably a section on the line 2—2 of Figure 3.

Figure 3 is a fragmentary horizontal sectional view taken through Figure 2.

Figure 4 is an elevation of the motor of the iceless machine or refrigerator showing the driven connections therewith in section.

Similar reference characters indicate corresponding parts throughout the several views in the drawings.

Figure 5:
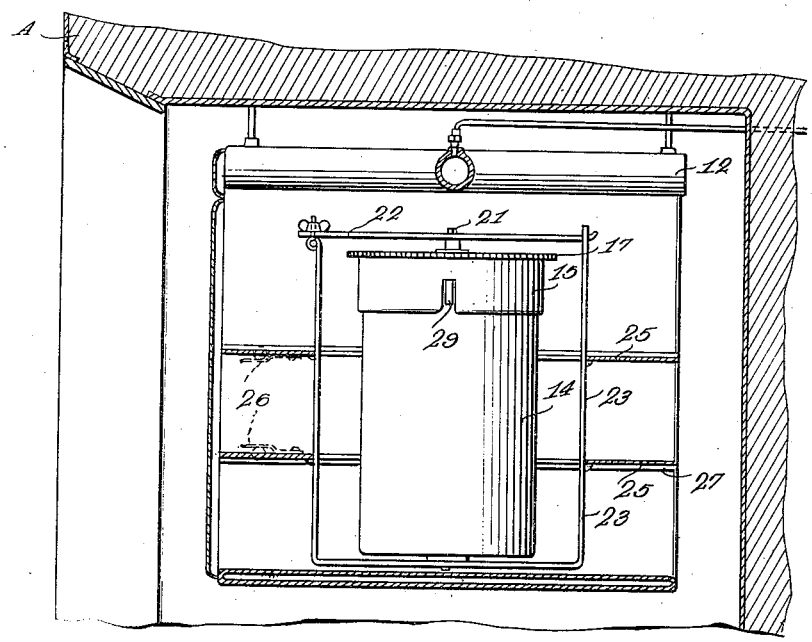
Figure 5 is an enlarged sectional view taken on the line 5—5 of Figure 1 looking in the direction of the arrows.
Figure 6:
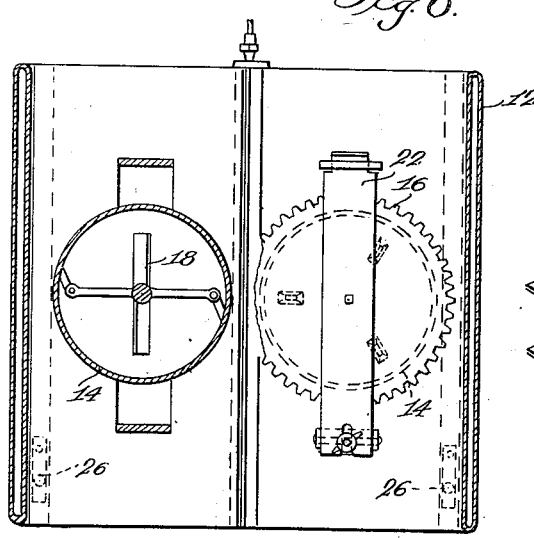
Figure 6 is a sectional view taken on the line 6—6 of Figure 1 looking in the direction of the arrows.
Figure 7:
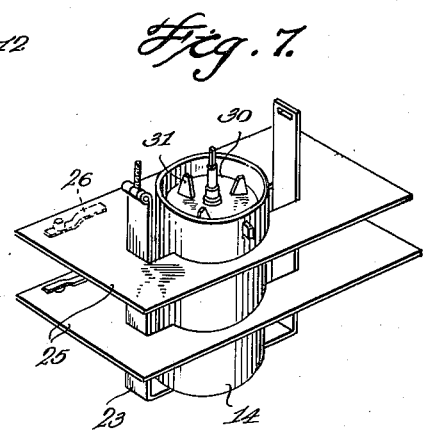
Figure 7 is a fragmentary perspective view of a portion of the apparatus.

Referring to the drawings in detail, A designates generally an iceless machine or refrigerator having within a cooling compartment 10 accessible from the front of the machine or refrigerator, a door 11 being provided for this purpose. In this compartment 10 is stored food stuff to be maintained fresh under refrigeration in the usual well-known manner.

Built within the compartment 10 is a freezing unit 12, being composed of the usual evaporating and expansion type as employed in ice machines or refrigerators and this unit creates within the same a space 13 for freezing purposes. Within this space 13 is accommodated the freezing apparatus constituting the present invention and hereinafter fully described.

The freezing apparatus in this instance comprises a pair of spaced perpendicularly disposed containers 14 adapted to hold cream or confections to be frozen. Each container 14 is open at its uppermost portion through which is introduced the substance to be frozen. The open uppermost portion of the container 14 has telescopically and slidably fitted thereon a cover or head 15, being formed exteriorly peripherally thereof with gear teeth 16 for meshing engagement with companion gear teeth 17 of the cover or head 15 of the other container of the pair so that motion is transferred from one container to the other for the rotation thereof in unison.

The containers 14 have within the same agitators or paddles 18, their center stems 19 at the lowermost ends being socketed at 20 while the upper ends are squared at 21 and are accommodated within correspondingly shaped openings formed in releasing straps 22 of supporting frames 23 for the containers, the latter being journaled at 24 in the bases of said frames 23 for rotation therein.

Joined with each frame 23 and loosely accommodating the container 14 companion thereto is a pair of vertically spaced holding plates 25, these being horizontally disposed in parallel relation to each other and are fitted with snap fasteners 26 for engagement with brackets 27 interiorly of the space 13 and a part of the freezing unit 12. The plates 25 prevent displacement of the frames when fitted within the space 13 in the unit 12 and these frames 23 with the said plates, when the latter carry the containers 14, are separated by a central partition 28 built within the space 13.

Each cover or head 15 is telescopically keyed at 29 with its companion container 14 so that the cover or head is free for sliding movement yet is rotatably locked with the container.

Within each container and floatable on the contents thereof is a lifter disk 30 being loose about the stem 19 of the agitator 18 and is provided with lifter risers 31 for contact with the cover or head 15 next thereto. Now the purpose of these lifter disks 30 will be hereinafter fully described.

Within the iceless machine or refrigerator A is the power motor 32 which has its driving shaft 33 geared at 34 with a flexible driven shaft 35 extending to the freezing unit 12 and through a spring-held displaceable gear 36 has driven connection with the gear teeth 16 on the cover or head 15 next to this connection 36. Thus the containers 14 are rotatably driven by transfer of power from the motor 32 through the shaft 35 for the freezing operation of the apparatus. Now when expansion of the frozen product within the container 14 having its cover or head 15 in direct driven connection with the gear 36 occurs, the lifter disk 30 rises therein lifting the said cover or head out of meshing engagement with the gear 36 and in this manner bringing both containers 14 to a standstill.

On the expansion of the product within the other container remote from the connection 36, the lifter disk 30 raises its cover or head 15 and in this manner this particular container will come to a standstill.

The freezing unit 12, on the operation of the iceless machine or refrigerator, effects the freezing of the contents of the containers 14 while the agitators 18 stir the contents of said containers during the operation of the apparatus.

The gear connection 36 of the type shown permits of the easy introduction of the containers 14 with the frames 23 and plates 25 into the space 13 in the unit 12 and the meshing engagement of the connections 36 with the cover or head next thereto. This is equally true on the removal of the containers 14 from the space 13 in the unit 12.

It is preferable to have the flexible shaft 35 incased, as at 37, a major portion of the shaft and the incasement being carried without the iceless machine or refrigerator A, as shown in Figure 1 of the drawings.

The agitators 18 when within the containers 14 are held fixed by the frames 23 while the containers 14 are free for rotation within the frames and the plates 25 joined with said frames.

The freezer apparatus is adaptable to various types of household refrigerating units of the iceless type.

The gear connection 36 of the spring-held type does not interfere with the introduction and removal of the freezing apparatus into and from the freezing unit 12 for the reasons before explained.

The releasing straps 22 of the frames 23 permit convenient removal of the covers or heads 15 from the containers 14 and also the removal of the latter from the said frames as well as the extracting or removal of the agitators 18 from the containers.

The gear teeth 17 on the covers or heads create gears for intermeshing engagement with each other in the set up of the pair of containers 14, these covers or heads being slidably keyed with the said containers so that said covers or heads can rise under the action of the lifter disks 30, hereinbefore described.

What is claimed is:

1. A freezing apparatus for food products adapted for insertion in the freezing compartment of a domestic refrigerator comprising a vertically disposed container, an agitator fitting said container, a carrying frame about said container and having means holding the same rigid within the freezing compartment, a cover fitting said container and displaceably connected therewith and effective for the rotation of said container, means on the frame for holding the agitator fixed, means connected with the cover for imparting rotation thereto, means for separably fastening the holding means within the compartment, and a floater within the container and automatically lifted on the expansion of the products within said container for disconnecting the driving connection of the cover with the second-named means.

2. A freezing apparatus for a domestic refrigerator having a freezing compartment, comprising a plurality of vertically disposed containers arranged side by side within said freezing compartment, agitators fitting said containers, a frame about each container and rigidly held within the freezing compartment, a cover fitting each container and displaceably connected therewith, gear connections between said covers, means on the frame for holding each agitator fixed, and a floater within each container and automatically lifted on expansion of the products therein for disconnecting the gear connections between said covers, and means associated with one of the covers for imparting rotation thereto.

DOCK F. HERMAN.
JOSEF NORDENHAUG.